Dec. 18, 1934.　　　O. VON GRUBER　　　1,985,066
PROJECTION SCREEN
Filed Dec. 21, 1933

Inventor:
Otto von Gruber

Patented Dec. 18, 1934

1,985,066

UNITED STATES PATENT OFFICE 1,985,066

PROJECTION SCREEN

Otto von Gruber, Jena, Germany, assignor to firm Carl Zeiss, Jena, Germany

Application December 21, 1933, Serial No. 703,445
In Germany December 24, 1932

2 Claims. (Cl. 33—20)

The invention concerns a projection screen to be used in apparatus for plotting maps from measuring images projected on a screen surface. When using screens of this kind, the necessity of an exact focusing of the measuring mark in the stereoscopic image produced by the projection of the measuring images of the object to be plotted requires a sufficient contrast between the projection surface and the measuring mark. The measuring marks generally applied so far have been black marks on a surface which reflects the light diffusely. Use may be made as well of luminous marks, that is to say of marks produced by means of an aperture provided in the projection screen and illuminated by a source of light disposed behind the screen. However, marks of this kind are not very practical.

According to the invention, a measuring mark which comes up to all requirements is obtained by representing the mark by means of an aperture in the projection screen and by providing that this aperture appears as a black surface. This is attained in the most simple manner by so dimensioning or constructing the projection screen that the light rays for the projection of the measuring images do not strike that side of the aperture which does not face the projection chambers of the plotting apparatus. The most convenient manner of avoiding this is to provide behind the aperture a closed chamber having black interior walls.

Figure 1:
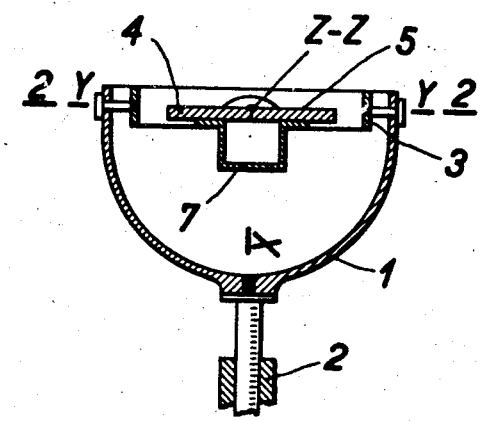
Figure 2:
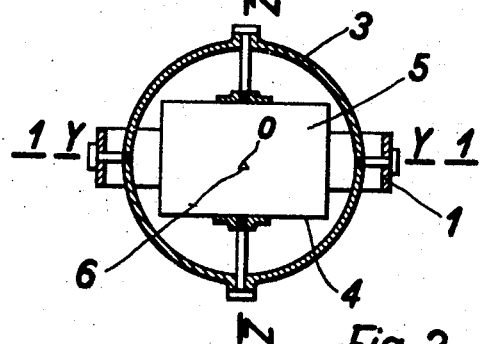

In the accompanying drawing, Figure 1 represents an elevational section through, and Figure 2 the top view of, a projection screen according to the invention.

A semi-circular holder 1 is adjustably mounted in a guide 2 assumed to be so placed by means of a foot on the drawing surface of a photographic plotting apparatus to be operated according to the double-projection method that the direction of displacement X—X of the holder 1 is at right angles to the plane of the drawing. A ring 3 is mounted on the holder 1 in such a manner as to be rotatable about an axis Y—Y, this ring 3 supporting a projection screen 4 rotatable about an axis Z—Z. The point of intersection O of the said two axes Y—Y and Z—Z lies in the surface 5 of the projection screen 4. This surface 5 may be coated for instance with a layer of white baryta. The projection screen 4 has a triangular aperture 6 whose one angle lies at the cardanic centre O. This angle is used as a measuring mark in the scanning of the composite stereoscopic image which results from the projection of two measuring images and corresponds to the object represented on the two measuring images by means of its single images. To the lower side of the projection screen 4 is attached a box 7 which is assumed to be lined for instance with black velvet, this box 7 preventing the access of light to the lower side of the aperture 6 and absorbing the light entering the aperture from above.

I claim:

1. A projection screen for apparatus for plotting maps from measuring images projected on a screen surface, this projection screen having an aperture which represents the measuring mark of the apparatus, and means disposed behind this aperture and making the aperture appear black.

2. A projection screen for apparatus for plotting maps from measuring images projected on a screen surface, this projection screen having an aperture which represents the measuring mark of the apparatus, and a closed chamber having black interior walls and being disposed behind the aperture.

OTTO VON GRUBER.